United States Patent
Smirnova et al.

(10) Patent No.: US 10,991,976 B2
(45) Date of Patent: Apr. 27, 2021

(54) SOLID-STATE ELECTROLYTES BASED ON LITHIUM HALIDES FOR ALL-SOLID-STATE LITHIUM-ION BATTERY OPERATING AT ELEVATED TEMPERATURES

(71) Applicant: South Dakota Board of Regents, Pierre, SD (US)

(72) Inventors: Alevtina Smirnova, Rapid City, SD (US); Matthew Dondelinger, Rapid City, SD (US); Joel Swanson, Rapid City, SD (US)

(73) Assignee: SOUTH DAKOTA BOARD OF REGENTS, Pierre, SD (US)

( * ) Notice: Subject to any disclaimer, the term of this patent is extended or adjusted under 35 U.S.C. 154(b) by 42 days.

(21) Appl. No.: 16/413,290

(22) Filed: May 15, 2019

(65) Prior Publication Data

US 2019/0356018 A1    Nov. 21, 2019

Related U.S. Application Data

(60) Provisional application No. 62/672,445, filed on May 16, 2018.

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/008* (2013.01)

(58) Field of Classification Search
None
See application file for complete search history.

(56) References Cited

U.S. PATENT DOCUMENTS

| | | | |
|---|---|---|---|
| 7,083,877 B2 | 8/2006 | Iwamoto et al. | |
| 7,666,807 B2 | 2/2010 | Heung et al. | |
| 7,914,932 B2 | 3/2011 | Yoshida et al. | |
| 8,349,498 B2 | 1/2013 | Oladeji | |
| 8,535,725 B2 | 9/2013 | Li et al. | |
| 8,758,715 B2 | 6/2014 | Wicks et al. | |
| 9,246,188 B2 * | 1/2016 | Zhao | C01D 15/00 |
| 9,580,320 B2 | 2/2017 | Inda | |
| 2010/0139320 A1 | 6/2010 | Schumacher et al. | |
| 2015/0364788 A1 * | 12/2015 | Lu | C04B 35/553 427/597 |
| 2018/0006306 A1 | 1/2018 | Zhu et al. | |

(Continued)

FOREIGN PATENT DOCUMENTS

WO    2012112229 A2    8/2012

OTHER PUBLICATIONS

Braga et al., Novel Li3ClO based glasses with superionic properties for lithium batteries, Mar. 2014, J Mater Chem A, 5470-5480 (Year: 2014).*

(Continued)

*Primary Examiner* — Daniel S Gatewood
(74) *Attorney, Agent, or Firm* — Goodhue, Coleman & Owens, P.C.

(57) ABSTRACT

Solid-state lithium-ion batteries with a solid-state antiperovskite electrolyte are disclosed. In one aspect, a solid-state $Li_3ClO$ electrolyte is deposited on a Cu-supported thin carbon working electrode using a delamination approach for half-cells with lithium metal as a reference electrode.

11 Claims, 9 Drawing Sheets

(56) References Cited

U.S. PATENT DOCUMENTS

2018/0277890 A1     9/2018   Ueda et al.

OTHER PUBLICATIONS

Lü, X., et al., "Antiperovskite Li3OCl Superionic Conductor Films for Solid-State Li-Ion Batteries". Advanced Science, 2016. 3(3), 5 pages.

Aguesse, F., et al., "Investigating the Dendritic Growth during Full Cell Cycling of Garnet Electrolyte in Direct Contact with Li Metal. ACS applied materials & interfaces", 2017. 9(4): p. 3808-3816.

Aurbach, D., et al., "A short review of failure mechanisms of lithium metal and lithiated graphite anodes in liquid electrolyte solutions". Solid state Ionics, 2002. 148(3-4): pp. 405-416.

Bachman, J.C., et al., "Inorganic solid-state electrolytes for lithium batteries: mechanisms and properties governing ion conduction". Chemical reviews, 2015. 116(1): p. 140-162.

Chien, W.-m., D. Chandra, and J.H. "Lamb, X-ray diffraction studies of Li-based complex hydrides after pressure cycling". Adv. X-Ray Anal, 2008. 51: p. 190-195.

Debenedetti, P.G. and F.H. Stillinger, "Supercooled liquids and the glass transition". Nature, 2001. 410(6825): p. 259-267.

Ganesh, P., P. Kent, and D.-e. Jiang, "Solid-electrolyte interphase formation and electrolyte reduction at Li-ion battery graphite anodes: Insights from first-principles molecular dynamics". The Journal of Physical Chemistry C, 2012. 116 (46): p. 24476-24481.

Hanghofer, I., et al., "Untangling the Structure and Dynamics of Lithium-Rich Anti-Perovskites Envisaged as Solid Electrolytes for Batteries". Chemistry of Materials, 2018. 30(22): pp. 8134-8144.

Harada, Y., et al., "Lithium ion conductivity of polycrystalline perovskite La 0.67—x Li 3x TiO 3 with ordered and disordered arrangements of the A-site ions". Solid State Ionics, 1998. 108(1): Abstract, 2 pages.

Hartmann, P., et al., "Degradation of NASICON-type materials in contact with lithium metal: Formation of mixed conducting interphases (MCI) on solid electrolytes". The Journal of Physical Chemistry C, 2011 117(41): p. 21064-21074.

Hitz, G.T., Ed. Wachsman, and V. Thangadurai, "Highly Li-Stuffed Garnet-Type Li7+ xLa3Zr2-xYx012". Journal of The Electrochemical Society, 2013. 160(8): pp. A1248-A1255.

Hood, Z.D., et al., "Li2OHCl crystalline electrolyte for stable metallic lithium anodes". Journal of the American Chemical Society, 2016. 138(6): p. 1768-1771.

Huang, M., et al., "Effect of sintering temperature on structure and ionic conductivity of Li7—xLa3Zr2O12—05 x (x= 0.5~0.7) ceramics". Solid State Ionics, Abstract, 2011. 204, 1 pages.

Inaguma, Y., et al., "High ionic conductivity in lithium lanthanum titanate". Solid State Communications, 1993. 86(10): Abstract, 1 page.

Kanno, R. and M. Murayama, "Lithium Ionic Conductor Thio-LISICON: The Li2 S GeS2 P 2 S 5 System". Journal of the Electrochemical Society, 2001. 148(7): Abstract, 1 page.

Kuhn, A., et al., "A new ultrafast superionic Li-conductor: ion dynamics in Li 11 Si 2 PS 12 and comparison with other tetragonal LGPS-type electrolytes". Physical Chemistry Chemical Physics, 2014. 16(28): p. 14669-14674.

Levi, M.D. and D. Aurbach, "The mechanism of lithium intercalation in graphite film electrodes in aprotic media. Part 1. High resolution slow scan rate cyclic voltammetric studies and modeling". Journal of Electroanalytical Chemistry, 1997. 421(1-2): Abstract, 1 page.

Momma, K. and F. Izumi, "VESTA 3 for three-dimensional visualization of crystal, volumetric and morphology data". Journal of applied crystallography, 2011. 44(6): Abstract, 1 page.

Ohta et al., Enhancement of the High-Rate Capability of Solid-State Lithium Batteries by Nanoscale Interfacial Modification. Advanced Materials 2006, 18: pp. 2226-2229.

Ohta, S., et al., "Co-sinterable lithium garnet-type oxide electrolyte with cathode for all-solid-state lithium ion battery". Journal of Power Sources, 2014. 265: Abstract (2 pages).

Richards, W.D., et al., "Interface stability in solid-state batteries". Chemistry of Materials, 2015. 28(1): p. 266-273.

Schweikert, N., et al., "Suppressed lithium dendrite growth in lithium batteries using ionic liquid electrolytes: Investigation by electrochemical impedance spectroscopy, scanning electron microscopy, and in situ 7Li nuclear magnetic resonance spectroscopy". Journal of Power Sources, 2013. 228: Abstract (2 pages).

Stegmaier, S., et al., "Li+ defects in a solid-state Li ion battery: theoretical insights with a Li3OCl electrolyte". Chemistry of Materials, 2017, pp. 4330-4340.

Takada, K., et al., "Interfacial phenomena in solid-state lithium battery with sulfide solid electrolyte". Solid State Ionics, 2012. 225: Abstract, 1 page.

Truong, L., et al., "Facile proton conduction in H+/Li+ ion-exchanged garnet-type fast Li-ion conducting Li 5 La 3 Nb 2 O 12". Journal of Materials Chemistry A, 2013. 1(43): pp. 13469-13475.

Truong, L, J. Colter, and V. Thangadurai, "Chemical stability of Li-stuffed garnet-type Li 5+ x BaxLa 3—x Ta 2 O 12 (x= 0, 0.5, 1) in water: a comparative analysis with the Nb analogue". Solid State Ionics, 2013. 247: Abstract, 2 pages.

Wang, H., et al., "Mn3O4—graphene hybrid as a high-capacity anode material for lithium ion batteries". Journal of the American Chemical Society, 2010. 132(40): p. 13978-13980.

Xu, K., "Nonaqueous liquid electrolytes for lithium-based rechargeable batteries". Chemical reviews, 2004. 104(10): p. 4303-4417.

Yang, H., G.V. Zhuang, and P.N. Ross, "Thermal stability of LiPF 6 salt and Li-ion battery electrolytes containing LiPF 6". Journal of Power Sources, 2006. 161(1): p. 573-579.

Ye, M., et al., "A respiration-detective graphene oxide/lithium battery". Journal of Materials Chemistry A, 2016. 4(48): Abstract, 1 page.

Zhang, J., et al., "High pressure-high temperature synthesis of lithium-rich Li 3 O (Cl, Br) and Li 3—x Ca x/2 OCl anti-perovskite halides". Inorganic Chemistry Communications, 2014. 48: p. 140-143.

Zhang S. K. Xu, and T. Jow, "EIS study on the formation of solid electrolyte interface in Li-ion battery". Electrochimica acta, 2006. 51(8): Abstract, 1 page.

Zhao, Y. and L.L. Daemen, "Superionic conductivity in lithium-rich anti-perovskites". Journal of the American Chemical Society, 2012. 134(36): p. 15042-15047.

Zhu, X. et al. "First principle calculation of lithiation/delithiation voltage in Li-ion battery materials". Chinese Science Bulletin, 2011. 56(30): p. 3229-3232.

\* cited by examiner

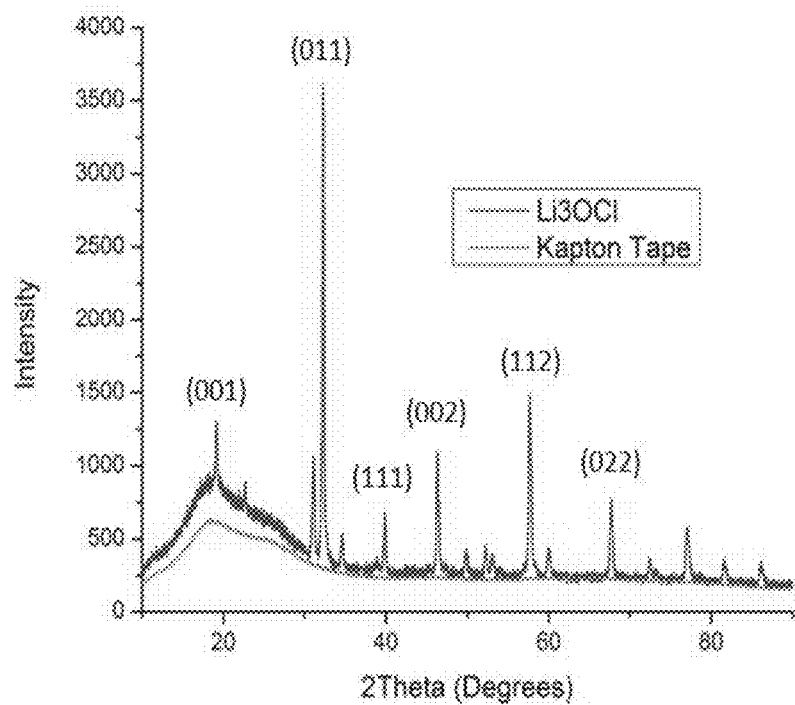
FIGURE 1
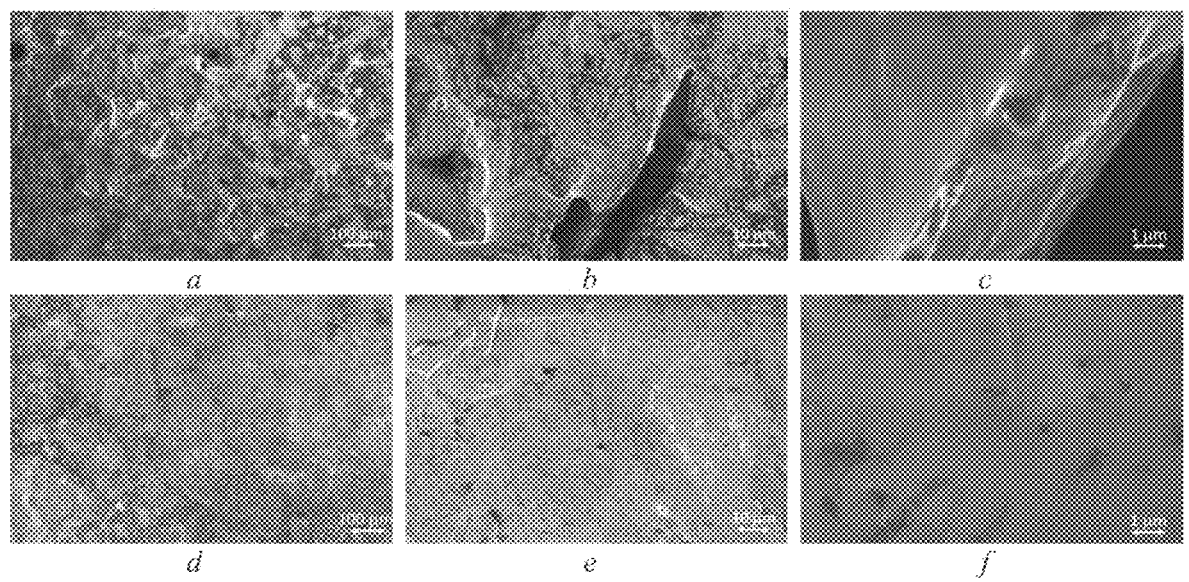
FIGURES 2(a-f)

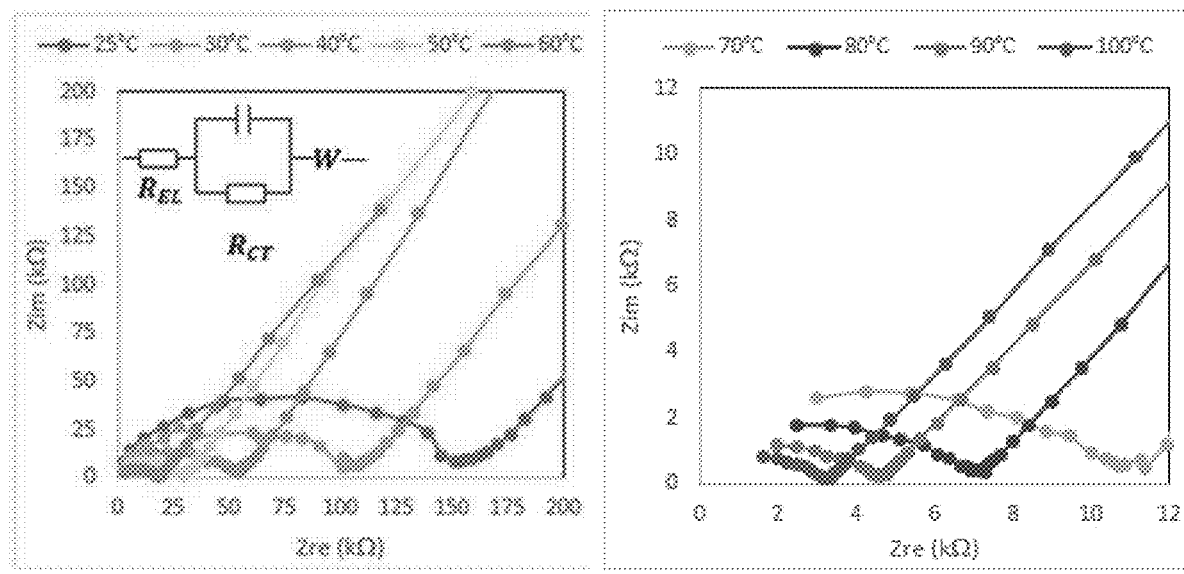
FIGURES 3(a-b)
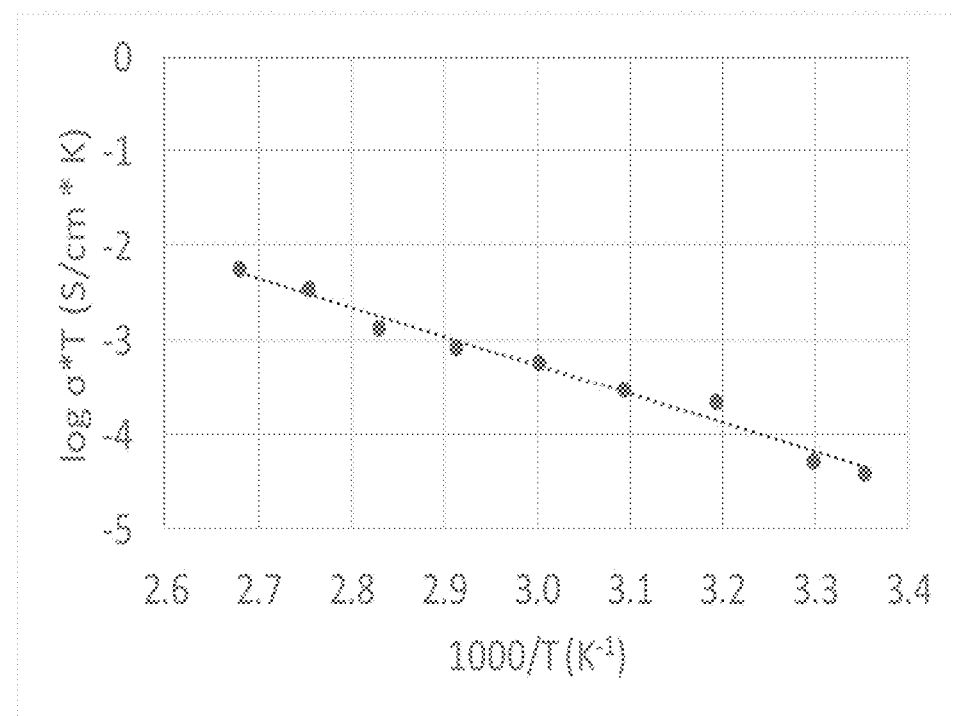
FIGURE 4

SOLID-STATE ELECTROLYTES BASED ON LITHIUM HALIDES FOR ALL-SOLID-STATE LITHIUM-ION BATTERY OPERATING AT ELEVATED TEMPERATURES

PRIORITY STATEMENT

This application claims priority to U.S. Provisional Patent Application No. 62/672,445, filed on May 16, 2018, titled SOLID-STATE ELECTROLYTES BASED ON LITHIUM HALIDES FOR ALL-SOLID-STATE LITHIUM-ION BATTERY OPERATING AT ELEVATED TEMPERATURES all of which is hereby incorporated by reference in its entirety.

GOVERNMENT SUPPORT CLAUSE

This invention was made with government support under NNX14AN22A and N68335-17-C-0016 awarded by National Aeronautics and Space Administration (NASA). The United States government has certain rights in the invention.

BACKGROUND

I. Field of the Disclosure

The results for solid-state $Li_3ClO$ electrolyte deposited on a Cu-supported thin carbon working electrode using delamination approach are presented for half-cells with lithium metal as a reference electrode. AC impedance spectroscopy demonstrates Arrhenius behavior for $Li_3ClO$ electrolyte in the temperature range of 23-100° C. with corresponding values of charge transfer resistance within 115-250 kOhm at the electrolyte thickness of 296-378 μm. The observed values of the charge transfer resistances were sufficient for CR2025 half-cell performance characterization in the temperature range of 50-100° C. Cyclic voltammetry performed at 50° C. and 100° C. for 100 cycles confirms that the half-cell performance during lithiation/delithiation from 0.05 to 1.V is highly reproducible and the CV spectra resolution improves at higher temperatures. The rate capability tests confirm absence of the specific capacity losses relevant to intercalation mechanism in the carbon-based working electrode and the capability of the solid-state membrane to provide lithium-ion transport.

The lithium-ion conductivity, cyclability, and chemical stability in realistic CR2025 half-cell operating conditions has been demonstrated for the first time. Once the electrolyte thickness and the working electrode composition in terms of ionic-electronic conductivity are optimized, the demonstrated solid-state technology will improve the safety of lithium-ion batteries while increasing the voltage and the operational temperature range.

II. Description of the Prior Art

Current liquid electrolyte lithium-ion batteries have a number of issues limiting their potential, such as poor safety especially during thermal runaway, narrow electrochemical window that prevents use of high-voltage cathodes, and dissolution of transition metals. On contrary, solid-state electrolytes possess capability to improve the lithium-ion battery performance while preventing lithium dendrite formation and enhancing cell safety at elevated temperatures. The present study is focused on the development of solid-state lithium-ion batteries with the solid-state antiperovskite electrolyte, specifically $Li_3ClO$, to eliminate the disadvantages of the lithium-ion batteries with liquid electrolytes.

BRIEF DESCRIPTION OF THE DRAWINGS

Illustrated embodiments of the disclosure are described in detail below with reference to the attached drawing figures, which are incorporated by reference herein, and where:

FIG. 1 The XRD spectrum of the $Li_3OCl$. The broad peak in the range of 10° to 30° 2Θ originates from the Kapton tape covering the sample in accordance with an illustrative embodiment;

FIGS. 2(a-f) are pictorial representations of SEM images of the $Li_3OCl$ electrolyte melted on a Ni-foil surface at ×100, ×1,000×10,000 without compression (a-c) and after compression (d-f);

FIGS. 3(a-b) are pictorial representations comparing the effect of temperature in the range of 23° C.≤T≤60° C. (a) and 70° C.≤T≤100° C. (b) for CR2025 half-cells with lithium halide 380 μm thick electrolyte and lithium metal reference electrode in the frequency range of 200 kHz to 10 mHz for CR2025 half-cells with $Li_3OCl$ solid-state electrolyte, carbon working electrode, and lithium metal as a reference. The equivalent circuit is shown as an inset in FIG. 3a;

FIG. 4 is a pictorial representation of the Arrhenius plot for $Li_3OCl$ solid-state electrolyte with lithium metal reference electrode in CR2025 half-cell configuration;

FIG. 5a is a pictorial representation of the CV comparison of the PEDOT polymer with the SiNPs-PEDOT nanocomposites formed by in-situ or ex-situ methods within the first cathodic scan from OCV to 0.05 V with an inset showing the CV of the PEDOT in accordance with an illustrative embodiment;

DETAILED DESCRIPTION

Figure 5:
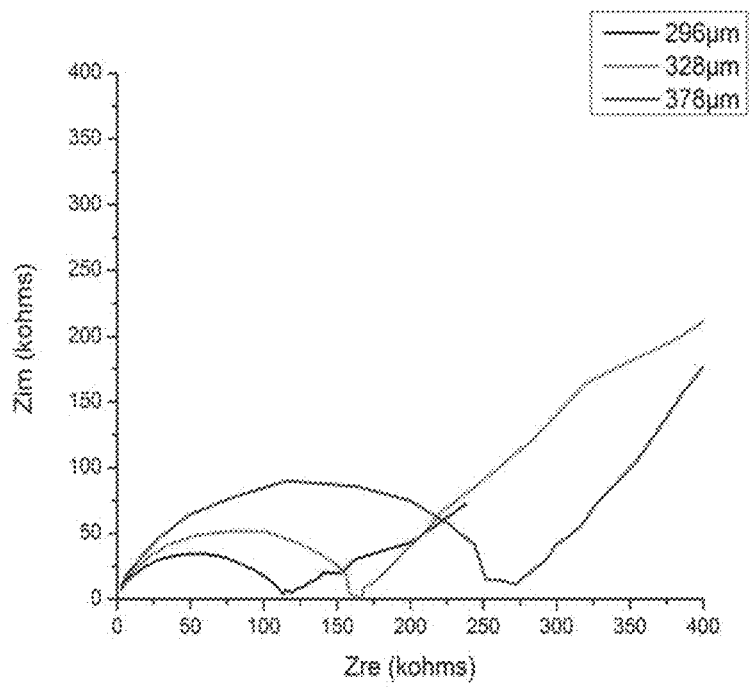
FIG. 5 is a pictorial representation of the effect of the $Li_3OCl$ solid-state electrolyte thicknesses for the CR2025 half-cells with carbon-based working electrode and lithium metal reference electrode derived from the AC impedance data in accordance with an illustrative embodiment.

Recent advances in lithium-ion battery technology allow storage of large amounts of energy, however these batteries lose charge over time due to liquid electrolyte decomposition and formation of the solid electrolyte interface (SEI) layers limiting mass transport and lithium-ion conductivity[1]. The liquid electrolytes, such as LiPF$_6$[2], have excellent conductivity, but are flammable and corrosive[3]. Furthermore, due to the narrow electrochemical window, these electrolytes do not allow use of high voltage cathodes or lithium anodes, thus limiting development of high-voltage batteries. Additionally, liquid electrolytes cannot be used with the high specific capacity lithium metal anodes due to dendrite formation[4].

In recent years, solid electrolytes are being explored as a novel way to avoid the dangers associated with current liquid electrolytes like LiPF$_6$ while simultaneously attempting to improve cell performance[5]. These new batteries employ solid electrolytes that are more stable than their liquid counterparts, inhibit lithium dendrite growth, and maintain charge capacity and density[6]. Solid state electrolytes are also capable of achieving higher voltages than liquid electrolytes due to their electrochemical stability when paired with lithium metal[6]. However, solid electrolytes that are the best for all-solid-state battery applications are still under debate. Electrochemical stability still requires extensive investigation and experimental studies since the simulations have failed to accurately predict the stability windows of these solid-state electrolytes[7]. Another obstacle is the lithium dendrite formation. While solid electrolyte membranes have been projected to prevent dangerous dendrite growth, some studies have shown that dendrites can form along the grain boundaries, e.g. in garnets[8, 9].

A broad spectrum of metal oxides, phosphates and sulfides have been tested as solid-state electrolytes for lithium-ion batteries. The primary advantage of oxides is their low charge transfer resistance at the electrolyte-electrode interface[10]. Furthermore, metal oxides, such as $Li_{7+x}La_3Zr_{2-x}Y_xO_{12}$[11], $Li_5La_3Nb_2O_{12}$[12], $Li_{5+x}Ba_xLa_{3-x}Ta_2O_{12}$[13], have low ionic conductivity ($\leq 10^{-4}$ S/cm). In comparison to metal oxides, phosphate- or sulfide-based lithium superionic conductors (LISICONs), such as $Li_{1+x-y}Al_x^{3+}M_y^{5+}M^{4+}_{2-x-y}(PO_4)_3$ (where M=Ge; M=Ti, Ge; and M=Ti, Ta) have slightly higher conductivity (~4·10$^{-4}$ S·cm$^{-1}$) than metal oxides. Superfast solid-state ionic conductor $Li_{3x}La_{2/3-x}TiO_3$[14] has even higher lithium-ion bulk conductivity (~1.5·10$^{-3}$ S/cm[15]), but its grain boundary conductivity is relatively poor.

Some lithium superionic conductors (LISICONs), especially sulfides (e.g. $Li_{10}GeP_2S_{12}$) have a theoretical ionic conductivity even greater than that of the current liquid electrolyte LiPF$_6$ at room temperature (~10$^{-2}$ S/cm)[16]. However, sulfides also have significant limitations, such as formation of interfacial layers that have poor ionic conductivity[17, 18]. As a silicon-based analogue of $Li_{10}GeP_2S_{12}$, $Li_{11}Si_2PS_{12}$ exhibits even higher performance and lower activation energy (0.20 eV) due to nearly isotropic lithium ion hopping in the crystalline lattice, but it is not chemically stable[19]. Furthermore, LISICONs in contact with lithium metal form low-conducting interphases[20] that makes them less desirable in solid-state battery applications.

In comparison to oxides and sulfides, the group of lithium halides have an advantage of the highest known ionic conductivity (~1.3·10$^{-3}$ S·cm$^{-1}$) at room temperature, large electrochemical window, and low probability of grain boundary effects[5, 21]. Lithium halide anti-perovskites are the most promising due to a high lithium concentration as well as high ionic conductivities. The $Li_3OCl_{0.5}Br_{0.5}$ anti-perovskite has been found to have a theoretical ionic conductivity of about 1.94×10$^{-3}$ S·cm$^{-1}$ that increases further with temperature[17]. It is expected that this type of solid-state electrolyte has even higher ionic conductivity approaching 10$^{-2}$ S·cm$^{-1}$ at 250° C.[5]. Additional advantage of the lithium halide anti-perovskites is their relatively low melting point (~282° C.)[5] that makes them more attractive for commercialization. Despite these benefits, lithium halides with antiperovskite crystal structure are not listed among better known lithium hydrides and nitrides, argirodites, LISICONs, perovskites, and garnets discussed in a recent comprehensive review[16].

The present application discusses the morphological, physical, and electrochemical properties of the lithium-rich anti-perovskites for solid-state battery applications in the broad temperature range from 23° C. corresponding to room temperature and up to 100° C. It is our hypothesis that all-solid-state batteries made with lithium-rich antiperovskite electrolyte will improve the safety of lithium-ion batteries, while expanding the operational voltage range by using high-voltage cathodes and providing capabilities to safely use lithium metal as an anode in high power and high energy density lithium-ion batteries.

EXPERIMENTAL

Materials

The materials used for making the electrolyte are lithium chloride>99% (STREM Chemicals Inc.) and lithium hydroxide≥98% (Sigma-Aldrich). The electrolyte was melted on annealed nickel foil with a thickness of 0.025 mm, and a 99.5% metal basis from Alfa Aeser. Carbon-coated copper electrodes with ~0.107 mg/cm$^2$ carbon loading were obtained from MTI Corp. The lithium foil 0.75 mm thick was purchased from Sigma Aldrich and Alfa Aeser. The CR2025 cases, 0.5 and 0.2 mm stainless steel spacers, and stainless steel wavesprings were purchased from MTI Corp.

Physical and Morphological Characterization

X-Ray diffraction of the solid-state was conducted using a Rigaku Ultima Plus theta-theta X-Ray diffraction instrument. X-rays of Cu-kα radiation (λ=1.54178 Å)) were used to scan the powder with a scan rate of 2° per minute along a range of 10° to 90° (2Θ). Kapton tape (25 μm thick) was used to cover moisture-sensitive antiperovskite samples for XRD analysis The SEM imaging was performed using a Supra 40VP (Zeiss) field emission scanning microscope with a nitrogen atmosphere. The secondary electron collector (SE2) was used as a detector with a working distance of 5.0 mm. The electron beam was held at 1 kV. SEM images were taken at ×100, ×1000, and ×10000 magnifications.

Electrochemical Cell Fabrication

For lithium halide electrolyte manufacturing, lithium chloride and lithium hydroxide were mixed with an agate mortar and pestle inside an argon MBraun glovebox. The all-solid-state electrolyte precursor was then deposited onto nickel foil inside the glovebox. A hotplate with a surface temperature of 350° C. was used to heat the solid electrolyte powder on the nickel foil for approximately ten minutes until it completely melts. C/Cu electrodes with a diameter of 17.0 mm and thickness of 0.012 mm were degassed in a vacuum overnight and pressed upon the molten electrolyte for approximately 15 seconds. The sandwich comprising of nickel foil with the molten electrolyte and C/Cu working electrode was then taken off the hotplate and allowed to cool. The nickel foil was delaminated from the solid-state electrolyte bonded to the working C/Cu electrode resulting in a C/Cu working electrode with a solid-state electrolyte layer. The thickness of the solid-state electrolyte membrane was measures inside the Ar glovebox by a Mitutoyo MDC-1" SB micrometer.

The electrochemical CR2025 half-cells were assembled with the C/Cu working electrode attached to the electrolyte membrane in contact with lithium metal disks of 14.5 mm in diameter. Before assembly, lithium disks were lightly scratched with stainless steel brush to improve the adhesion with the solid-state electrolyte membrane. The active surface area of the half-cells defined by the area of lithium metal disks was ~165 $mm^2$. The scratched lithium disks were placed on top of the electrolyte membrane. A stainless steel spacer and a wave-spring were then added on top of the lithium disk before the cap is placed onto the cell. The cells were sealed at 1000 psi using a MSK-110 Hydraulic Crimping Machine from MTI Corp. in an Ar glovebox with ≤1 ppm $H_2O$ and ≤1 ppm $O_2$.

Electrochemical Analysis

The AC Impedance measurements of the all-solid-state CR2025 half-cells was conducted using Parstat 2273 Advanced Electrochemical System from Princeton Applied Research. The Z' and Z" data was sampled with 30 points taken over the frequency range of 200 kHz to 10 mHz using logarithmic point spacing and an AC amplitude of 5.00 mV rms.

Rate capability, cycling, and cyclic voltammetry tests were conducted using a Scribner Associates Model 580 Battery Test Station and an Arbin system. The tests at elevated temperatures utilized a sand-baths with temperature controllers to maintain the specific temperature required for each experiment. The C-rate was calculated based on the weight of carbon on the carbon coated copper foil and further tuned after a few initial cycles. Cyclic voltammetry tests at a scan rate of 0.1 mV/sec were performed at room temperature, 50° C., and 100° C. within the range of 0.05V to 1.0V for multiple tests ranging from 3 to 100 complete cycles.

For the rate capability and cyclability performance evaluation, the CR2025 half-cells were tested in the range of 0.05V and 1.0V. To observe the effects of temperature on performance, two sets of the C-rate capability tests were run at 50° C. and at 100° C. The currents applied during the rate capability tests were $4.25·10^{-7}$ A (~C/20), $8.5·10^{-7}$ A (~C/10), and $1.7·10^{-6}$ A (~C/5) with a total of 3 cycles for each current and, finally, 3 cycles at $4.25·10^{-7}$ (~C/20) to observe the effects of possible capacity loss and reproducibility. Additional cycling tests were performed at 50° C. and 100° C. at $1.7·10^{-6}$ A (C/5) for 300+ cycles and may be found in the supplementary information.

RESULTS AND DISCUSSION

Materials Characterization

The XRD data (FIG. 1) represents the crystal structure of the solid-state lithium halide $Li_3OCl$ electrolyte. The sample was obtained by mixing and melting inorganic precursors on the nickel foil substrate and then covered with Kapton inside the glovebox to prevent moisture contamination. The spectrum reveled the major peaks at 011, 002, and 112 as well as the smaller peaks at 001, 111, and 022 that match the previous data[5] reported for $Li_3OCl$ and confirms its antiperovskite crystal structure.

The SEM morphological characterization of the lithium halide electrolyte after being melted and compressed on the Ni foil surface at 350° C. (FIG. 2) reveals a relatively uniform surface with few defining features. This is in stark contrast to the much rougher surface of uncompressed $Li_3OCl$ at the same magnifications. The uncompressed electrolyte appears to have several crystalline planes that intersect each other across the surface, as well as some large pockmarks that become easily visible at higher magnifications (FIG. 2). The surface of the compressed electrolyte is much smoother with less significant morphological changes across the surface. The morphology of the compressed electrolyte structure appears to be more homogenous without any indication of crystallization that could happen if the temperature regime does not satisfy complex behavior of viscous liquids close to the glass transition temperature[22].

ELECTROCHEMICAL TESTING

AC Impedance Spectroscopy

The AC impedance data (FIG. 3) for the all-solid-state CR2025 half-cells with the membrane thickness of 360 μm at different temperatures are represented by semicircles relevant to the membrane charge-transfer resistance and the linear Warburg impedance at lower frequencies responsible for the lithium-ion diffusion. At room temperature the electrolyte membrane demonstrates an extremely high charge transfer resistance of 180 kΩ which is too high for adequate lithium-ion half-cell battery performance. An increase in temperature causes corresponding decrease in the electrolyte resistance which results in resistance values of ~3 kΩ at 100° C. The Arrhenius plot (FIG. 4), as relationship between log (σT) (S/cm*K) vs. 1000/T ($K^{-1}$), is linear which indicates absence of crystal phase changes within the electrolyte membrane that usually takes place in garnet-type solid-state ceramic electrolytes[23]. The Arrhenius plot (FIG. 4) and the corresponding activation energies were calculated using the known equation[5] $\sigma T=A*exp(-E_a/kT)$, where σ—ionic conductivity, $E_a$—activation energy for lithium-ion transport, k—Boltzmann constant, and A—pre-exponential factor. The activation energy at room temperature was found to be ~0.31 eV and decreased to ~0.276 eV and ~0.225 eV at 50° C. and 100° C. respectively. The activation energy from our tests was found to be lower than reported earlier[24] for thin film $Li_3OCl$ (0.31 eV vs 0.35-0.36 eV) produced by a pulsed laser deposition (PLD). The difference could be a result of different mixing, synthesis, and solidification conditions where the powder precursors are mixed and homogenized before the melting process. The calculated ionic conductivity values ($1.26×10^{-7}$ S/cm) were slightly lower in comparison to the ionic conductivity of bulk $Li_3OCl$ at $5.8×10^{-7}$ S/cm[24]. However, it is much lower than thin film ionic conductivity of $10^{-4}$-$10^{-5}$ S/cm which highlights the importance of reliable thin-film manufacturing approach.

Besides the temperature effect on the half-cell performance, the electrolyte thickness' impact on all-solid-state battery performance has been analyzed and is illustrated by FIG. 5.

Cyclic Voltammetry

Figure 6A:
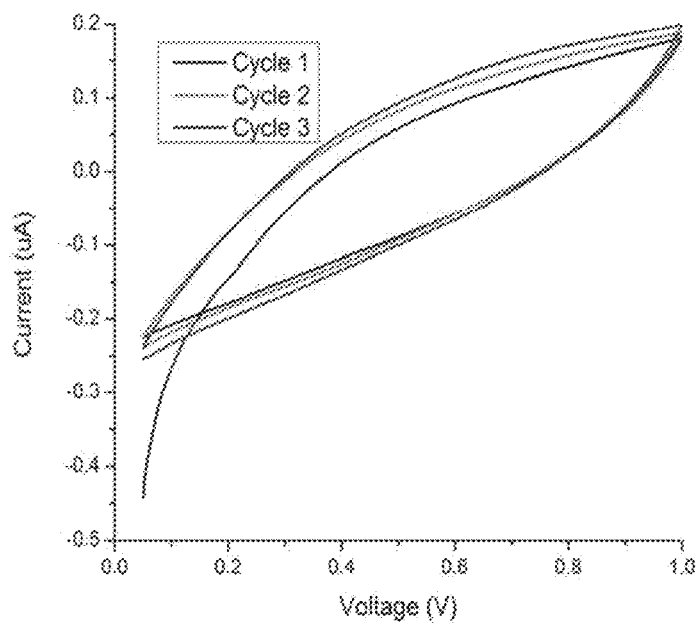
FIGS. 6(a-c) are pictorial representations of cyclic voltammetry data for the solid-state CR2025 half-cells with $Li_3OCl$ 360 μm thick solid-state electrolyte, carbon-based anode, and lithium metal reference electrode at 25° C. (a), 50° C. (b), and 100° C. (c) in accordance with an illustrative embodiment.
Figure 6:
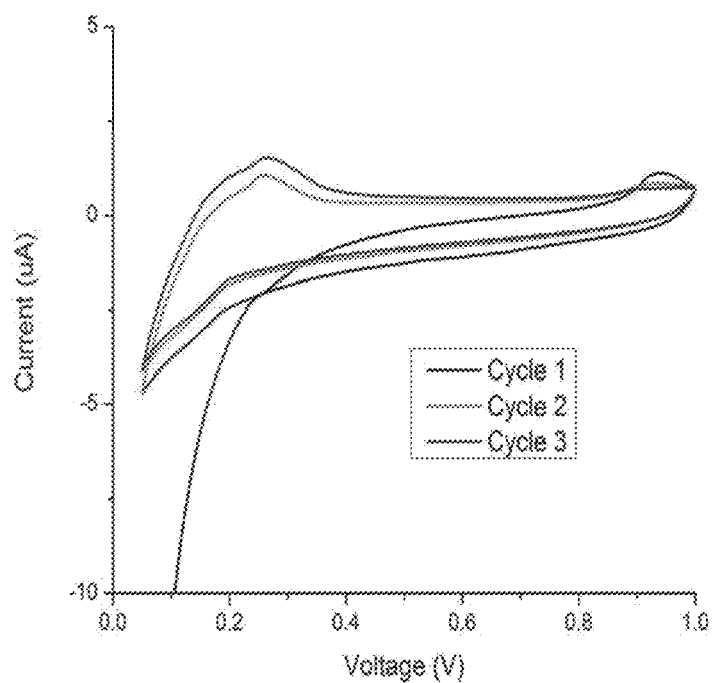
Figure 6C:
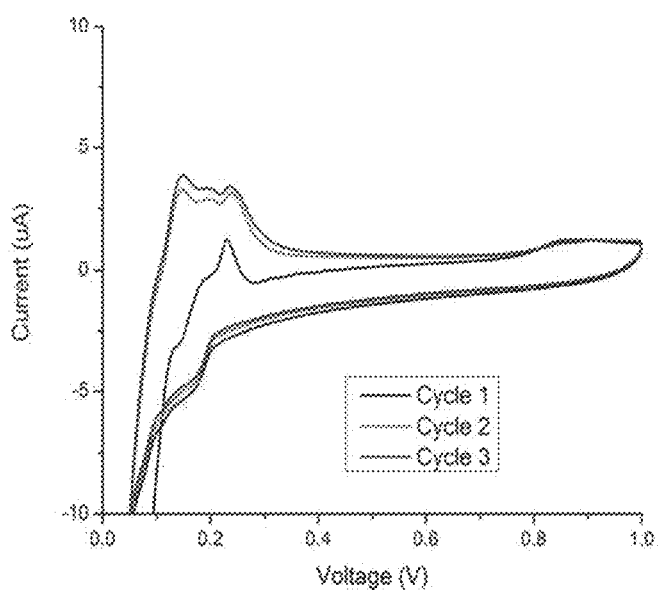

The impact of temperature on the solid-state cells was further investigated by cyclic voltammetry at 23° C., 50° C., and 100° C. (FIGS. 6a-c). At room temperature (FIG. 6a), due to high charge transfer resistance in thick $Li_3OCl$ electrolyte layer, the peaks relevant to lithium intercalation-deintercalation within carbon phase are not visible. However, at 50° C. (FIG. 6b) the lithiation peak is visible at 0.20V. This value is in correlation with those reported earlier[25] and confirms that at this temperature the lithium-ion intercalation into the carbon phase takes place. At 100° C. (FIG. 6c) the lithiation peak has much higher resolution than at 50° C. due to the 10× drop in the charge transfer resistance (25.0 kΩ vs. 2.51 kΩ) (FIGS. 3a-b). Furthermore, at 100° C. two distinct peaks are visible close to 0.2V region observed at 50° C., one of them at 0.165V and the second at 0.25V. It is assumed, that the CV peaks at 0.165V and 0.25V correspond to different activation energies of the atoms on the surface of carbon nanoparticles participated in the intercalation process a reference here (I have no access to article, need it sent to me to make a ref)?[26]. Overall, the current density at 100° C. is almost 10× higher than at 50° C. that indicates more efficient lithium-ion transport and is direct correlation with the impedance data (FIG. 3) and indicates that lowering CR2025 half-cell charge-transfer resistance through increased temperatures can significantly improve the electrochemical performance and promote lithium-ion transport making the lithiation/delithiation process favorable at room temperature and below.

Figure 7:
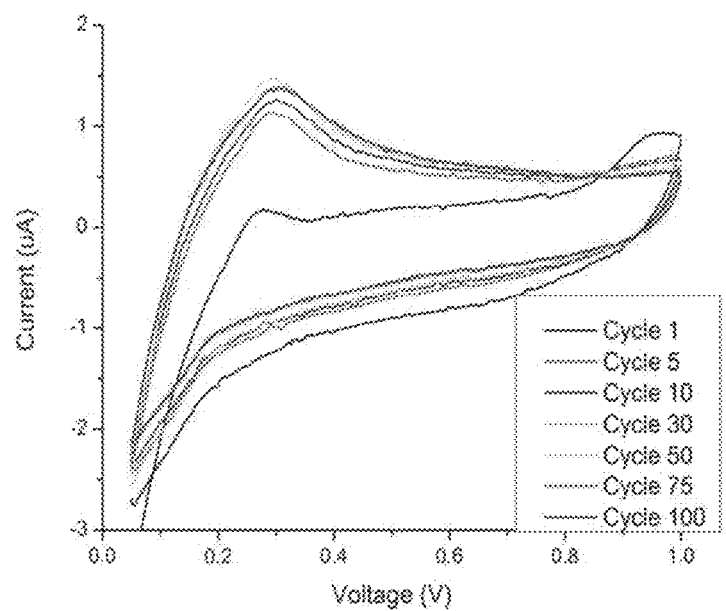
FIGS. 7(a-b) are pictorial representations of Cyclic voltammetry in 100 cycles for CR2025 half-cell with ~360 μm thick $Li_3OCl$ solid-state electrolyte, lithium metal reference electrode, and C/Cu working electrode at 50° C. (a) and 100° C. (b) in accordance with an illustrative embodiment.
Figure 7:
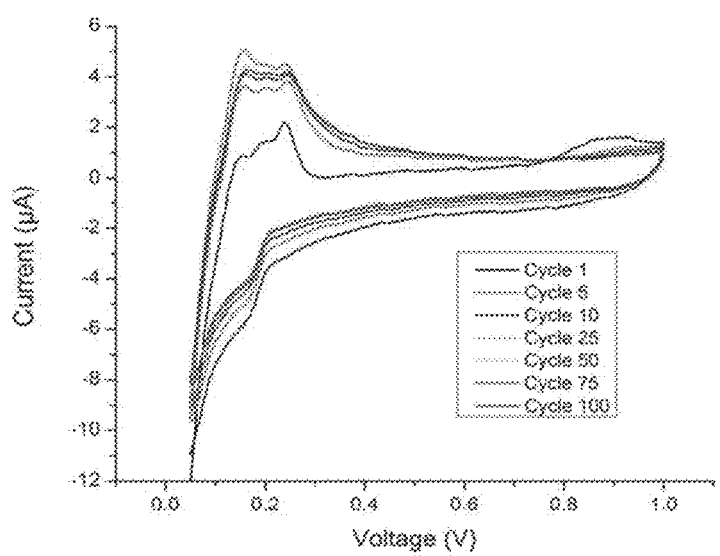
Figure 8:
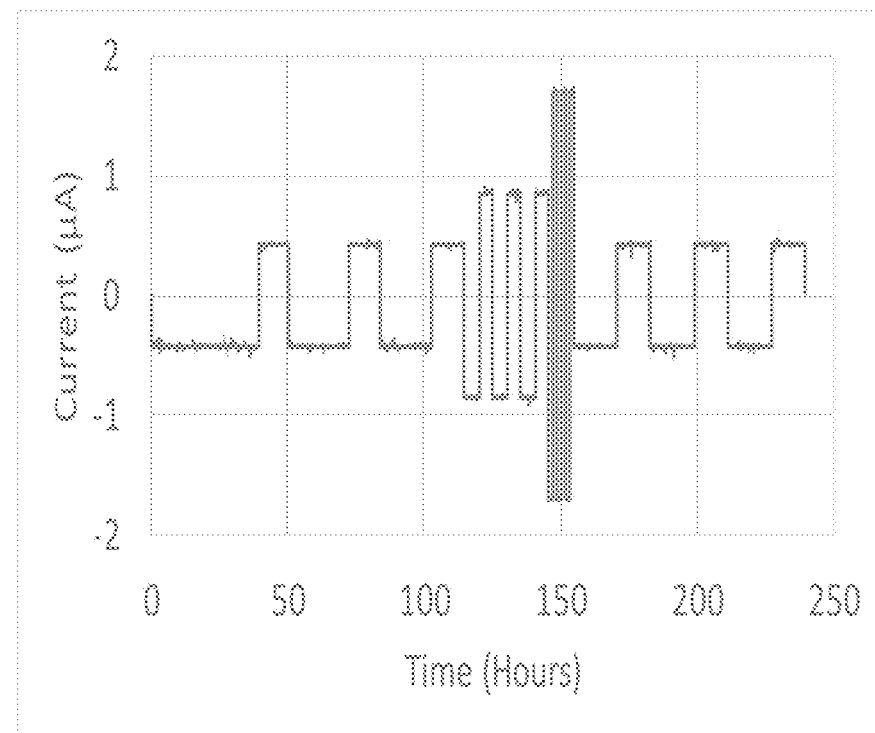
FIGS. 8(a-b) are pictorial representations of Rate capability at C/20, C/10, C/5, and C/20 (3 cycles each) for the all-solid-state CR2025 half-cells with lithium metal reference electrodes and C/Cu working electrodes at 50° C. (a) and 100° C. (b) in accordance with an illustrative embodiment.
Figure 8:
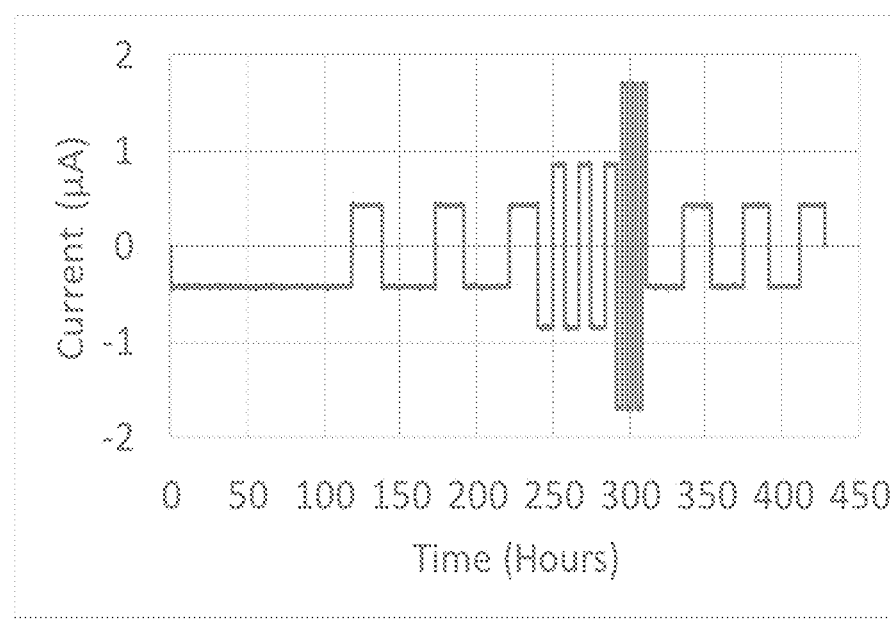

The extended CV data (100 cycles at 0.1 mV/sec) demonstrated a conditioning effect and CV stabilization after approximately 20 cycles (FIG. 7). This effect, different from that for the cells with liquid electrolyte[27], resulted in a permanent performance improvement after the initial 20 cycles and could be attributed to the formation of lithium-ion transport channels within $Li_3OCl$ solid-state electrolyte matrix. It is worth mentioning that this mechanism differs significantly from previously observed graphite anodes in contact with liquid electrolytes[28]. Previously, performance deterioration was explained by SEI formation on graphite surfaces with gradually increasing SEI thickness over time due to liquid electrolyte decomposition that significantly increased graphite electrode impedance upon prolonged Li insertion—deinsertion cycling. However, in the case of $Li_3OCl$, supported by impedance data (FIG. 3) and extended cyclic voltammetry results (FIG. 8), an assumption can be made that solid $Li_3OCl$ electrolyte does not initiate the SEI formation resulting in overall performance stabilization.

C-Rate Capability Evaluation

In addition to AC impedance spectroscopy and CV studies, the CR2025 solid-state half-cells with C/Cu working electrode have been evaluated in terms of their C-rate capability (FIGS. 8a-b) with at least three cycles performed at each C-rate. Due to the high resistance of the solid-state membrane at room temperature (FIG. 3a) the C-rate capability tests were conducted at 50° C. and 100° C. In case of liquid electrolytes, these tests are usually performed to identify specific capacity losses due to the solid electrolyte interface (SEI) layer formation[29]. It is currently unknown if the solid-state electrolytes form the SEI layers similar to those formed in liquid cells. However, the results generated for C/Cu working electrode (FIGS. 8a-b) promote the assumption that the SEI does not form in the presence of $Li_3OCl$ electrolyte which is in correlation with the CV (FIG. 7) and AC impedance data (FIG. 3).

Figure 9:
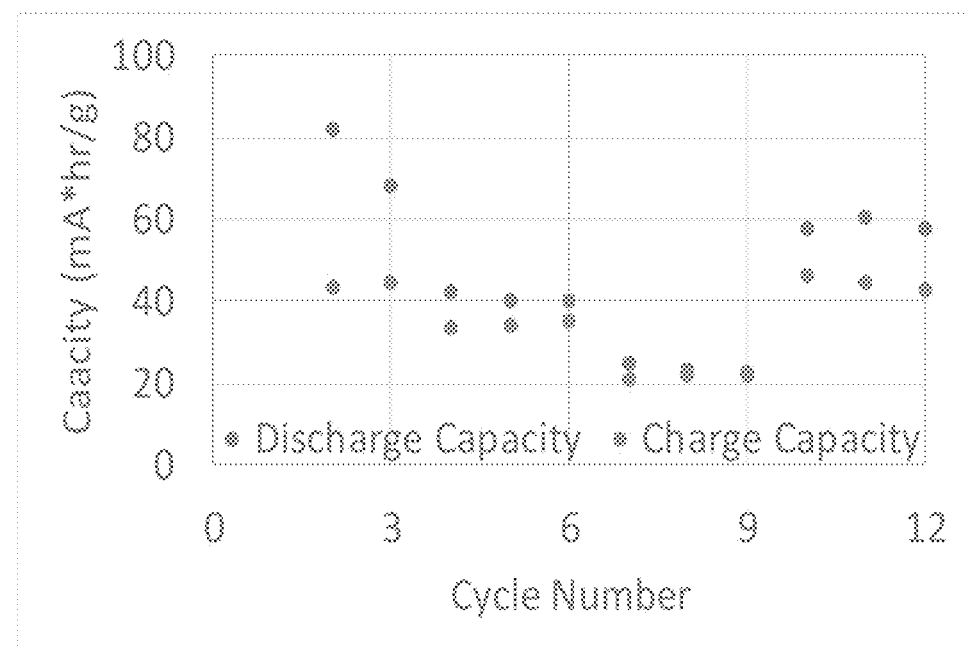
FIGS. 9(a-b) are pictorial representations of specific capacity at C/20, C/10, C/5, and C/20 (3 cycles each, 1st C/20 cycle was used to discharge the cells from OCV and is not shown on the graphs) vs. the cycle number for the solid-state CR2025 half-cell with lithium metal reference electrode and C/Cu working electrode at 50° C. (a) and 100° C. (b)
Figure 9:
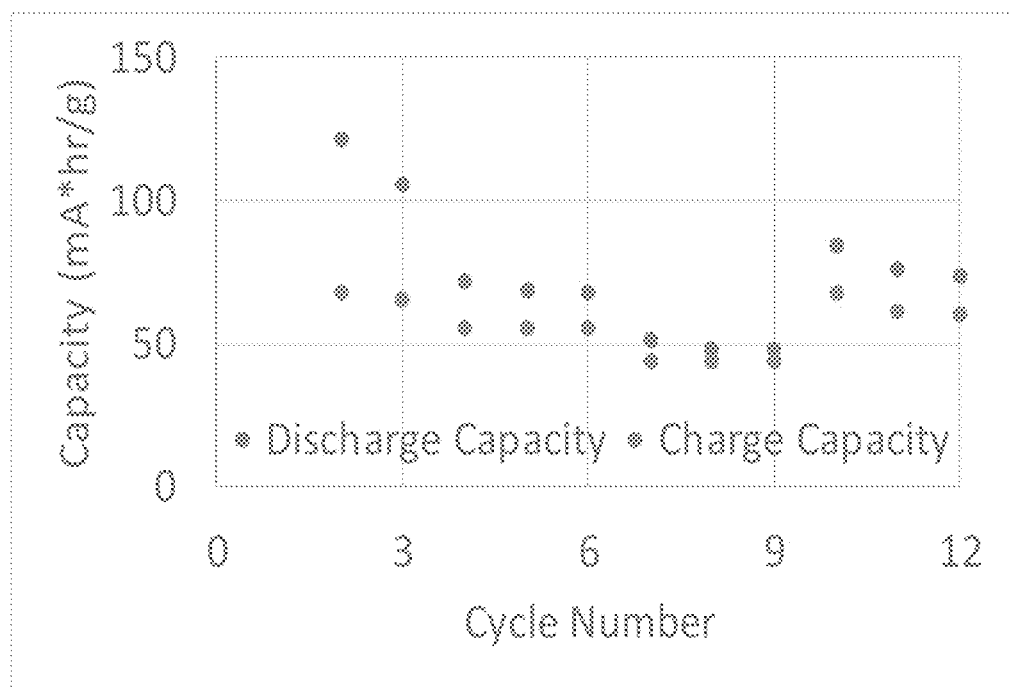

The C-rate capability tests (FIGS. 8-9) confirm the performance reproducibility, absence of the specific capacity losses within carbon working electrode, and the capability of the solid-state membrane to provide lithium-ion transport providing specific energy of ~125 W·hr/kg.

Galvanostatic Cycling

Figure 10:
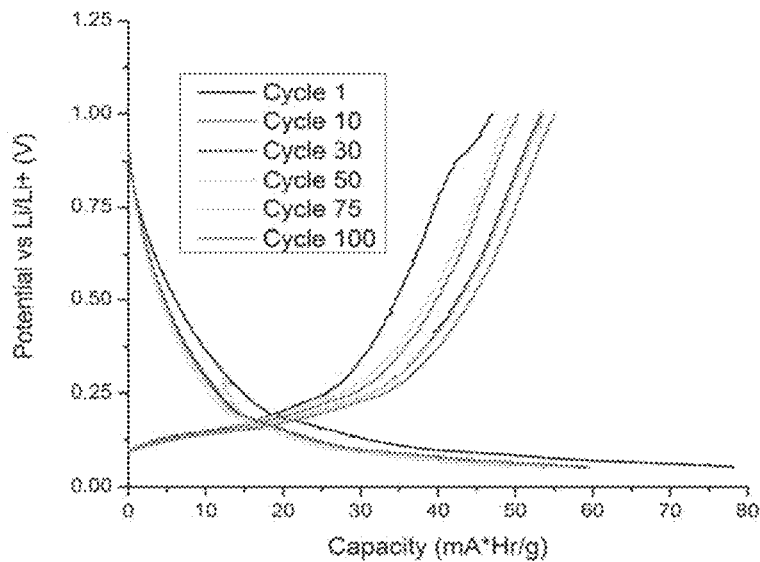
FIG. 10 is a pictorial representation of Galvanostatic charge—discharge voltage vs. capacity profiles of the Cu/C half cells with $Li_3OCl$ 350 μm thick electrolyte at in the voltage range of range 0.05-1.0 V (vs. Li metal) at ~C/5 rate (a) 50° C. and (b) 100° C.
Figure 10:
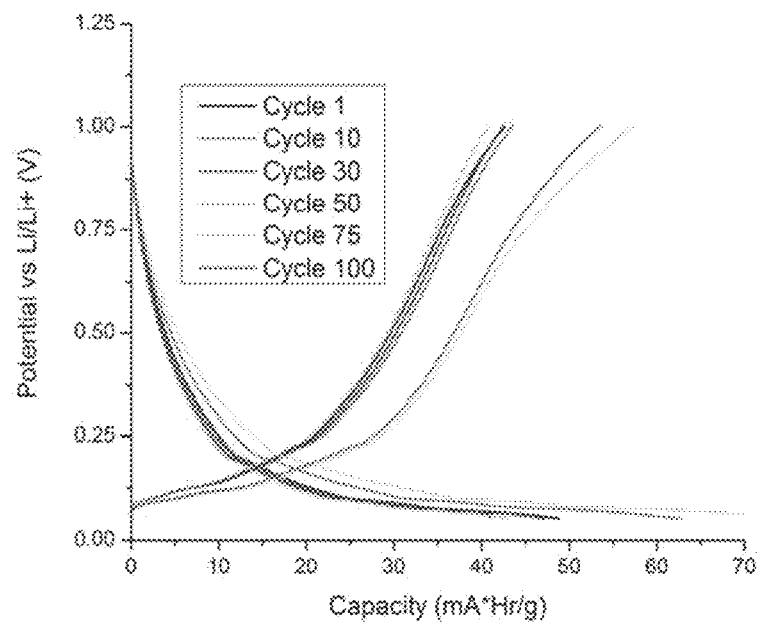

Discharge-charge cycling was carried out in the voltage window of 0.05-1.0 V (vs. Li) for 100 cycles at a rate of C/5 (current density of 7.3 mAg$^{-1}$) with temperatures of 50° C. and 100° C. (FIG. 10). For clarity, only selected cycles are shown. The open-circuit voltage (OCV) of the fabricated half-cells was about 1.2 V. During the first discharge and the following cycles, almost no voltage loss has been detected. Within the first cycles, the charge curves shift towards the higher capacity values (FIG. 10b) and merge during the following $10^{th}$-$50^{th}$ cycles. This electrochemical behavior implies that full and stable capacity reached only after 10-15 cycles is possibly due to the enhancement of the ionic transport mechanism kinetics within the $Li_3OCl$ electrolyte under electrical bias conditions. It is assumed that the conditioning effect extending up to the $10^{th}$ cycle is due to lithium intercalation/deintercalation within carbon structure that requires several charge-discharge cycles to establish conduction pathways for Li$^+$ cations and intimate electronic and ionic contact between $Li_3OCl$ solid-state electrolyte and carbon.

Figure 11:
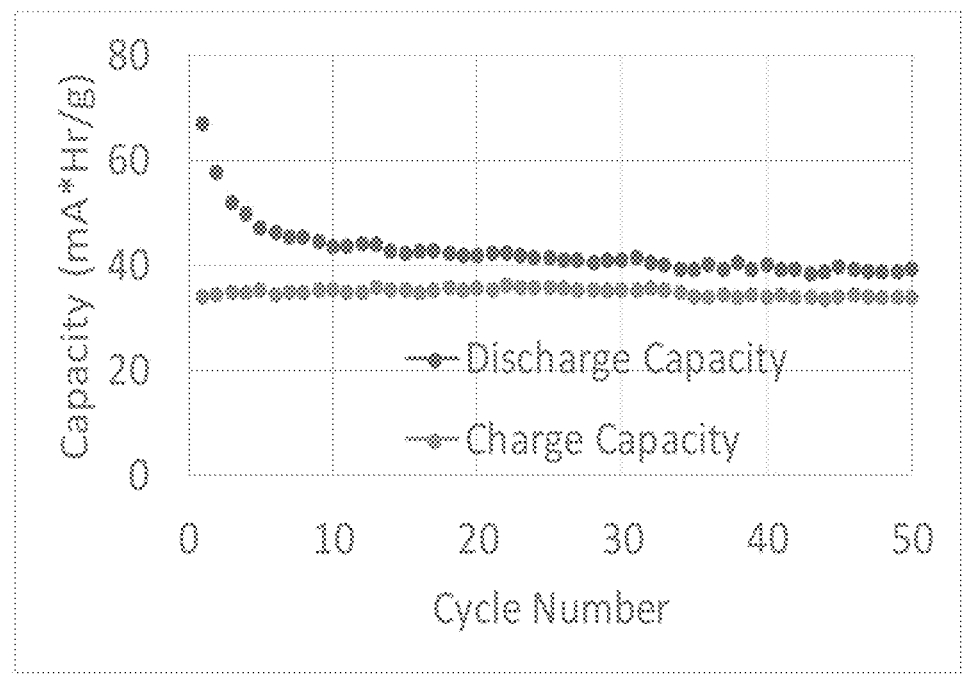
FIG. 11 is a pictorial representation of cyclability test at 50° C. for a C/Cu working electrode with a C-rate of ~C/10 (50 cycles) and the corresponding specific capacity at ~C/10 for 50 cycles at 50° C. for the solid-state half-cell CR2025 with lithium metal reference electrode and C/Cu working electrode with carbon loading of ~0.107 mg/cm$^2$.
Figure 11:
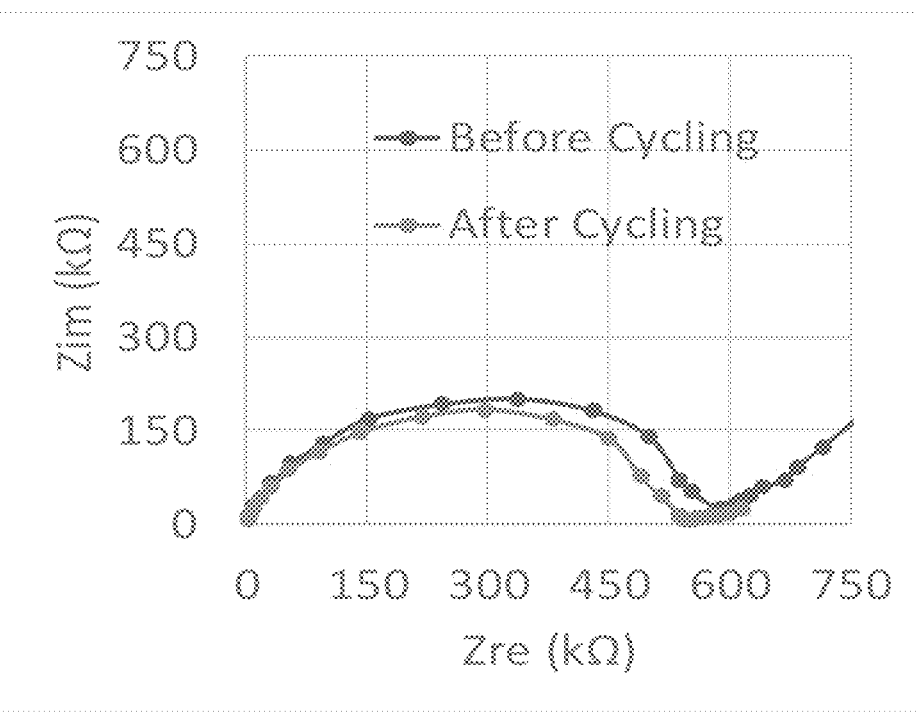

Cyclability tests (current vs. time and specific capacity vs. cycle number) of the solid-state half cells at a rate of ~C/10 (FIG. 11) demonstrate consistent performance over a 500 hour period with minimal performance deterioration after completing 50 cycles at 50° C. (FIG. 11b).

The specific capacity vs. cycle number demonstrates stable performance at 35 and 45 mAh/g for charge and discharge, respectively. Extended cycling tests have also been conducted and exceeded 300 cycles without visible performance losses at both 50° C. and 100° C. These tests may be found in the supplementary data. The consistency and performance of these tests demonstrates, for the first time, the ability of $Li_3OCl$ electrolyte to perform for extremely long periods of time. This is in contrast to the drastic capacity loss observed previously with thin film cells after only a dozen cycles[24]. $Li_3OCl$-based half-cells have now demonstrated the ability to maintain consistent capacity over the course of 300+ cycles, meeting an important requirement for the future possibilities and commercialization potential of the solid-state electrolyte. These values can also be further enhanced by optimization of the working electrode in terms of lithium-ionic conductivity and electrode morphology.

CONCLUSIONS

Based on $Li_3OCl$ supertonic glass-ceramic electrolyte with antiperovskite crystal structure, the performance of the CR2025 solid-state lithium-ion half-cells with C/Cu working electrode and lithium metal as a reference electrode has been successfully demonstrated for the first time in the temperature range of 50° C. to 100° C. Due to the large membrane thickness (296 μm-378 μm) and high charge-transfer resistance, the half-cell performance at room temperature could not be detected. However, based on the Arrhenius plots for $Li_3ClO$-based half cells and the correlation between the electrolyte thickness and the operation temperature, it can be concluded that a thinner membrane should be capable of performing well at lower temperatures (e.g. RT). Additionally, the thermal runaway at higher current loads (C-rates), a known weakness for lithium-ion batteries with liquid electrolytes, is considered to be beneficial to solid state lithium-ion batteries leading to higher battery performance. This assumption is further supported by the CV data for CR2025 solid-state half-cells which illustrated that at elevated temperatures a higher CV spectrum resolution is achieved. With proper tuning and an improved application process to produce a substantially thinner electrolyte membrane, it should be possible to produce a functional solid-state cell capable of working at lower temperatures. Overall, this is an extremely favorable result for all-solid-state batteries' potential in elevated temperature applications and illustrates their potential to operate in lower temperature applications in the future.

The demonstrated CR2025 half-cells with solid-state electrolyte demonstrated stable performance over 50 cycles at C/5 C-rate at both 50° C. and 100° C. (See supplemental information). The solid-state half cells perform at elevated temperatures which is a significant advantage when compared to traditional batteries with liquid electrolytes. The results demonstrate the half-cell specific capacity improvement with temperature. The relatively low absolute values of specific capacity can be attributed to the low carbon loading and absence of solid-state electrolyte in the active carbon-based layer. Based on the demonstrated CR2025 half-cell performance, current studies are focused on replacing thin carbon layers with thicker graphene-based layers impregnated with $Li_3OCl$ as a solid-state electrolyte.

The results from the electrochemical analysis of the lithium-ion half-cells is a starting point in the development of safe and reliable all-solid-state batteries. This study demonstrates a step forward toward development of technology for the high-power density and safe lithium-ion batteries operating at elevated temperatures.

This ability of the $Li_3OCl$ electrolyte to perform over extended periods of time without performance deterioration is confirmed by this experiment for the first time.

LIST OF REFERENCES CITED

The following documents are cited in this application, and are incorporated herein in their entirety:
1. Ganesh, P., P. Kent, and D.-e. Jiang, *Solid-electrolyte interphase formation and electrolyte reduction at Li-ion battery graphite anodes: Insights from first-principles molecular dynamics.* The Journal of Physical Chemistry C, 2012. 116(46): p. 24476-24481.
2. Xu, K., *Nonaqueous liquid electrolytes for lithium-based rechargeable batteries.* Chemical reviews, 2004. 104(10): p. 4303-4418.
3. Yang, H., G. V. Zhuang, and P. N. Ross, *Thermal stability of LiPF 6 salt and Li-ion battery electrolytes containing LiPF 6.* Journal of Power Sources, 2006. 161(1): p. 573-579.
4. Schweikert, N., et al., *Suppressed lithium dendrite growth in lithium batteries using ionic liquid electrolytes: Investigation by electrochemical impedance spectroscopy, scanning electron microscopy, and in situ 7Li nuclear magnetic resonance spectroscopy.* Journal of Power Sources, 2013. 228: p. 237-243.
5. Zhao, Y. and L. L. Daemen, *Superionic conductivity in lithium-rich anti-perovskites.* Journal of the American Chemical Society, 2012. 134(36): p. 15042-15047.
6. Hood, Z. D., et al., *Li2OHCl crystalline electrolyte for stable metallic lithium anodes.* Journal of the American Chemical Society, 2016. 138(6): p. 1768-1771.
7. Richards, W. D., et al., *Interface stability in solid-state batteries.* Chemistry of Materials, 2015. 28(1): p. 266-273.
8. Aguesse, F., et al., *Investigating the Dendritic Growth during Full Cell Cycling of Garnet Electrolyte in Direct Contact with Li Metal.* ACS applied materials & interfaces, 2017. 9(4): p. 3808-3816.
9. Stegmaier, S., et al., *Li+ defects in a solid-state Li ion battery: theoretical insights with a Li3OCl electrolyte.* Chemistry of Materials, 2017.
10. Ohta, S., et al., *Co-sinterable lithium garnet-type oxide electrolyte with cathode for all-solid-state lithium ion battery.* Journal of Power Sources, 2014. 265: p. 40-44.
11. Hitz, G. T., E. D. Wachsman, and V. Thangadurai, *Highly Li-Stuffed Garnet-Type Li7+xLa3Zr2−xYxO12.* Journal of The Electrochemical Society, 2013. 160(8): p. A1248-A1255.
12. Truong, L., et al., *Facile proton conduction in H+/Li+ ion-exchanged garnet-type fast Li-ion conducting Li 5 La 3 Nb 2 O 12.* Journal of Materials Chemistry A, 2013. 1(43): p. 13469-13475.
13. Truong, L., J. Colter, and V. Thangadurai, *Chemical stability of Li-stuffed garnet-type Li 5+x BaxLa 3−x Ta 2 O 12 (x=0, 0.5, 1) in water: a comparative analysis with the Nb analogue.* Solid State Ionics, 2013. 247: p. 1-7.
14. Inaguma, Y., et al., *High ionic conductivity in lithium lanthanum titanate.* Solid State Communications, 1993. 86(10): p. 689-693.
15. Harada, Y., et al., *Lithium ion conductivity of polycrystalline perovskite La 0.67−x Li 3x TiO 3 with ordered and disordered arrangements of the A-site ions.* Solid State Ionics, 1998. 108(1): p. 407-413.
16. Bachman, J. C., et al., *Inorganic solid-state electrolytes for lithium batteries: mechanisms and properties governing ion conduction.* Chemical reviews, 2015. 116(1): p. 140-162.
17. Kanno, R. and M. Murayama, *Lithium Ionic Conductor Thio-LISICON: The Li2 S GeS2 P 2 S 5 System.* Journal of The Electrochemical Society, 2001. 148(7): p. A742-A746.
18. Takada, K., et al., *Interfacial phenomena in solid-state lithium battery with sulfide solid electrolyte.* Solid State Ionics, 2012. 225: p. 594-597.
19. Kuhn, A., et al., *A new ultrafast superionic Li-conductor: ion dynamics in Li 11 Si 2 PS 12 and comparison with other tetragonal LGPS-type electrolytes.* Physical Chemistry Chemical Physics, 2014. 16(28): p. 14669-14674.
20. Hartmann, P., et al., *Degradation of NASICON-type materials in contact with lithium metal: Formation of mixed conducting interphases (MCI) on solid electrolytes.* The Journal of Physical Chemistry C, 2013. 117(41): p. 21064-21074.
21. Zhang, J., et al., *High pressure-high temperature synthesis of lithium-rich Li 3 O (Cl, Br) and Li 3−x Ca x/2 OCl anti-perovskite halides.* Inorganic Chemistry Communications, 2014. 48: p. 140-143.
22. Debenedetti, P. G. and F. H. Stillinger, *Supercooled liquids and the glass transition.* Nature, 2001. 410(6825): p. 259.
23. Huang, M., et al., *Effect of sintering temperature on structure and ionic conductivity of Li7−xLa3Zr2O12−0.5x (x=0.5~0.7) ceramics.* Solid State Ionics, 2011. 204: p. 41-45.
24. Lü, X., et al., *Antiperovskite Li3OCl Superionic Conductor Films for Solid-State Li-Ion Batteries.* Advanced Science, 2016. 3(3).
25. Zhu, X., et al., *First principle calculation of lithiation/ delithiation voltage in Li-ion battery materials.* Chinese Science Bulletin, 2011. 56(30): p. 3229.
26. Levi, M. D. and D. Aurbach, *The mechanism of lithium intercalation in graphite film electrodes in aprotic media. Part 1. High resolution slow scan rate cyclic voltammetric studies and modeling.* Journal of Electroanalytical Chemistry, 1997. 421(1-2): p. 79-88.

27. Wang, H., et al., *Mn3O4—graphene hybrid as a high-capacity anode material for lithium ion batteries*. Journal of the American Chemical Society, 2010. 132(40): p. 13978-13980.
28. Aurbach, D., et al., *A short review of failure mechanisms of lithium metal and lithiated graphite anodes in liquid electrolyte solutions*. Solid state ionics, 2002. 148(3-4): p. 405-416.
29. Zhang, S., K. Xu, and T. Jow, *EIS study on the formation of solid electrolyte interface in Li-ion battery*. Electrochimica acta, 2006. 51(8): p. 1636-1640.

What is claimed is:

1. A method for preparing solid-state electrolyte based on lithium halides for solid-state lithium-ion electrochemical cells; processing the solid-state electrolyte using a C/Cu working electrode and lithium metal as a reference electrode.

2. The method of claim 1 further comprising:
charging and discharging the solid-state electrolyte at elevated temperatures.

3. The method of claim 1, wherein the electrolyte comprises a solid-state antiperovskite electrolyte, such as Li3ClO.

4. The method of claim 1 further comprising:
processing the solid-state electrolyte from a solid-state Li3ClO superionic glass-ceramic electrolyte.

5. The method of claim 4 further comprising:
processing the solid-state Li3ClO electrolyte by depositing the electrolyte on a Cu-supported thin carbon working electrode using a delamination approach.

6. The method of claim 1, wherein the electrochemical cells comprise a CR2025 half-cell.

7. The method of claim 2, wherein the solid-state electrolyte is charged and discharged at a temperature range of 50° C. to 100° C.

8. A solid-state electrolyte based on lithium halides for solid-state lithium-ion electrochemical cells;
processing the solid-state electrolyte using a C/Cu working electrode and lithium metal as a reference electrode.

9. The solid-state electrolyte of claim 8 comprising a solid-state Li3ClO superionic glass-ceramic electrolyte.

10. The solid-state electrolyte of claim 8 wherein the electrochemical cell comprises a CR2025 half-cell.

11. The solid-state electrolyte of claim 8 having an operating charging and discharging temperature range from at least 50° C. to 100° C.

* * * * *